United States Patent [19]

Koerner

[11] 4,325,052
[45] Apr. 13, 1982

[54] TRAILER LIGHT CONNECTION SYSTEM

[76] Inventor: Steve J. Koerner, 2168 Sargent St., Simi Valley, Calif. 93063

[21] Appl. No.: 120,118

[22] Filed: Feb. 11, 1980

[51] Int. Cl.³ .............................................. B60Q 1/00
[52] U.S. Cl. .................................... 340/67; 250/206; 315/77; 307/10 LS
[58] Field of Search ..................... 340/67; 307/10 LS; 315/77, 82; 250/206

[56] References Cited

U.S. PATENT DOCUMENTS

| | | | |
|---|---|---|---|
| 1,450,549 | 4/1923 | Howard | 250/206 |
| 3,144,561 | 8/1964 | Farrell | 250/206 |
| 3,671,757 | 6/1972 | Klein | 315/82 |
| 3,848,227 | 11/1974 | Helm | 340/67 |
| 4,006,453 | 2/1977 | Bryant | 340/67 |
| 4,064,413 | 12/1977 | Andersen | 340/67 |

*Primary Examiner*—Glen R. Swann, III

[57] ABSTRACT

Trailer taillights are electrically controlled in response to the operation of a tow vehicle's taillights. Light emitted by the towing vehicle taillights is detected by electronic light sensors. The sensors are connected to circuits equipped with taillight switching devices for left and right brake or turn indication controlled by level discriminating circuits. The circuit operation involves a threshold of detection which automatically varies in response to the light level sensed in the present and immediate past thus allowing operation in the differing light conditions associated with sunlight and illuminated or non-illuminated tow vehicle running lights. Trailer running lights are controlled principally by detection of the trailer's motion and secondarily by detection of the tow vehicle taillights. Trailer running lights are further controlled by a time delay circuit providing continued operation for a period of time after the trailer comes to rest. An auxiliary inertial deceleration sensor can also provide a trailer braking indication when moderate or strong braking deceleration occurs.

14 Claims, 6 Drawing Figures

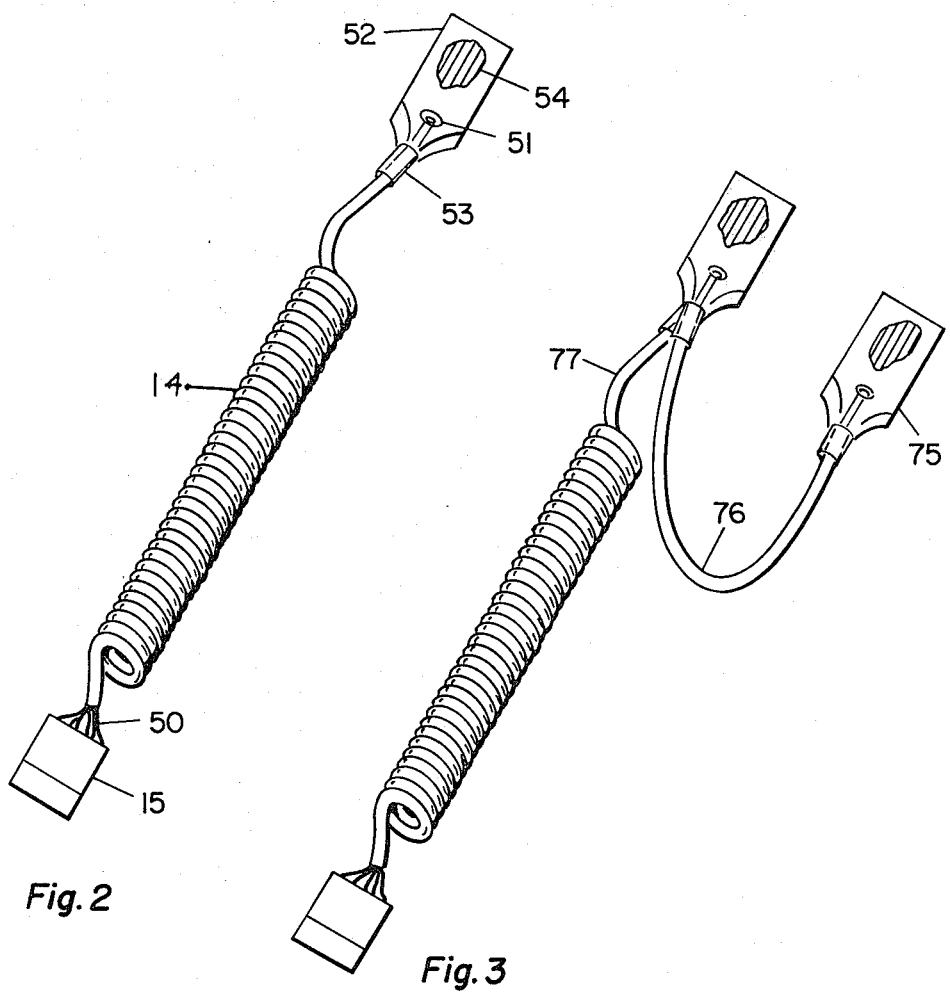
Fig. 2
Fig. 3
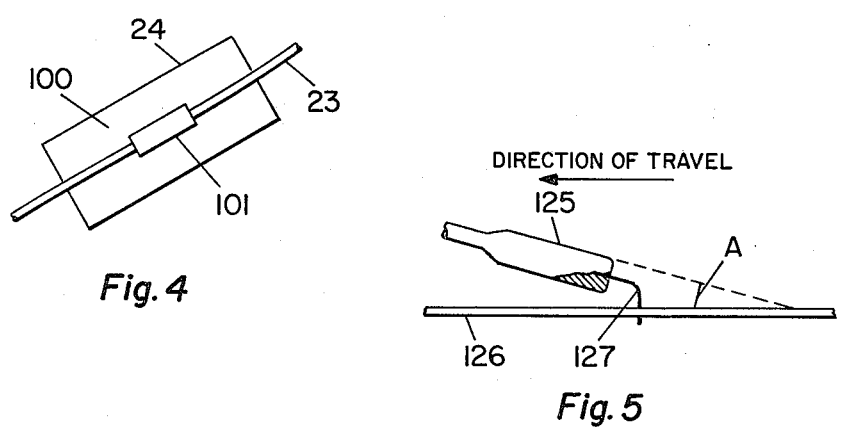
Fig. 4
Fig. 5

TRAILER LIGHT CONNECTION SYSTEM

FIELD OF INVENTION

This invention relates to trailer lights and specifically to an improved temporary system of connecting same to a towing vehicle.

DISCUSSION OF PRIOR ART

For safety and for compliance with the requirements of the law it is generally necessary that trailers be equipped with taillights which operate in concert with the taillights of its towing vehicle. Whenever a particular trailer is expected to be repetitively connected to a tow vehicle, common practice calls for the use of an electrical connector, one half of which is wired to the towing vehicle's taillight circuits and the mating portion of which is wired to the trailer's taillights. There are many varieties of connectors which are readily available for this purpose and most of the varieties do not intermate.

When a trailer is to be connected to a towing vehicle on a temporary basis, as for example at a rental yard, the installation of a connector is generally not warranted due to the expense of the connector and the labor to install it. Common practice in the prior art requires that the individual wires associated with the trailer's taillights be connected to the corresponding individual wires of the towing vehicle's taillight circuits. Several different techniques are commonly used to accomplish these direct electrical connections: the wires can be stripped and joined by twisting then insulated with electrical tape, by a second method the wires are stapled or pinned together then insulated with electrical tape, a third method in common use utilizes an expanding insulation piercing single wire connecting device. At least two varieties of these connecting devices are commercially available: Both devices are designed to fold around the individual wires of the tow vehicle's taillight circuit and in the process pierce the wire's insulation and permanently snap together forming a female connector receptacle. With the latter method, mating male plugs are permanently attached to the end of the wires from the trailer to facilitate connection to the connector receptacles attached to the two vehicle wiring. A fourth method of direct electrical connection utilizes so-called "tap-lights." In this method the tow vehicle's taillamp bulbs are replaced with bulbs equipped with short wire leads terminated with female connector receptacles. The leads extend outside the vehicle's taillamp lenses and are connected to the trailer by means of male connector plugs as described above.

There are significant disadvantages associated with each of the aforementioned prior art methods. Each of the methods involve a direct electrical connection between the tow vehicle's lighting circuits and the trailer's lights. As a result the tow vehicle's electrical circuits are frequently loaded beyond their design capacity. Some of the problems reportedly associated with the additional loading of the trailer's taillamps are, blown fuses, irregular flasher operation, damaged flashers, and damaged turn signal switches. Another disadvantage of the direct electrical connection is the hazard of short circuiting the tow vehicle's lighting system. Shorts are particularly common because the trailer wires are exposed to frequent abrasion and damage by trunk lids and the like. Shorts are also reported to be a frequent problem during the process of identifying tow vehicle wiring, wherein an insulation piercing test device is applied to the vehicle's taillamp wires, sometimes passing entirely through the conductor and shorting to the metal structure beneath the wire being tested. When the first or second above mentioned methods are used another hazard of short circuiting exists during the process of attaching the trailer's wires or afterwards if the insulating tape is not adequately applied. Shorts generally cause a blown fuse and sometimes cause damage to flashers or more serious problems when vehicle fuses have been intentionally defeated through previous expedience.

Other disadvantages of the prior art methods of trailer light hook-up are associated with the necessity of locating, accessing and identifying tow vehicle taillamp wiring. These problems vary by vehicle type. Accessing wiring sometimes requires removal of trunk carpeting or removal of interior panel components as is frequently the case for station wagons and vans. When wire harness accessing promises to present particular difficulty, the "tap-light" method is commonly selected as the preferred prior art method though installation of the "tap-lights" can itself be time consuming and since the "tap-lights" are usually left in place the cost of the device must be born and an esthetic disadvantage may be associated with the leads extending from the taillamp housing. Identifying tow vehicle taillight wiring is generally a trial and error process and is best accomplished with the use of a special testing device. False indications result when the testing device is not properly grounded.

Trailer lighting is generally wired with three circuits; running lights, left turn or brake and right turn or brake. Most towing vehicles are directly compatible with this arrangement, however a significant proportion use four circuits instead of three. In these instances, in the prior art, a circuit module is commonly installed to convert the tow vehicle's four circuits to the trailer's three thus involving additional time and expense.

OBJECTS

Accordingly several objects of my invention are:
(1) A temporary system for hook-up of trailer lights that can be accomplished in a minimum amount of time.
(2) A system which can be accomplished by a uniform method on many different types of vehicles thus providing simplicity of operation.
(3) A system which isolates the trailer's taillight circuits from the tow vehicle's taillight circuits thus preventing problems caused by overloading and short circuits.
(4) A system which can accommodate four taillight circuit tow vehicles without the necessity of a hardwired adapter.

DRAWINGS

FIG. 2 is a sensor lead assembly terminated with one light sensing photodiode.

FIG. 3 is a sensor lead assembly terminated with two light sensing photodiodes in cascade.

FIG. 4 is a sliding magnetic attachment device with a short length of insulated wire.

FIG. 5 is a mercury sensing switch mounted on a printed circuit board.

DESCRIPTION

Figure 1:
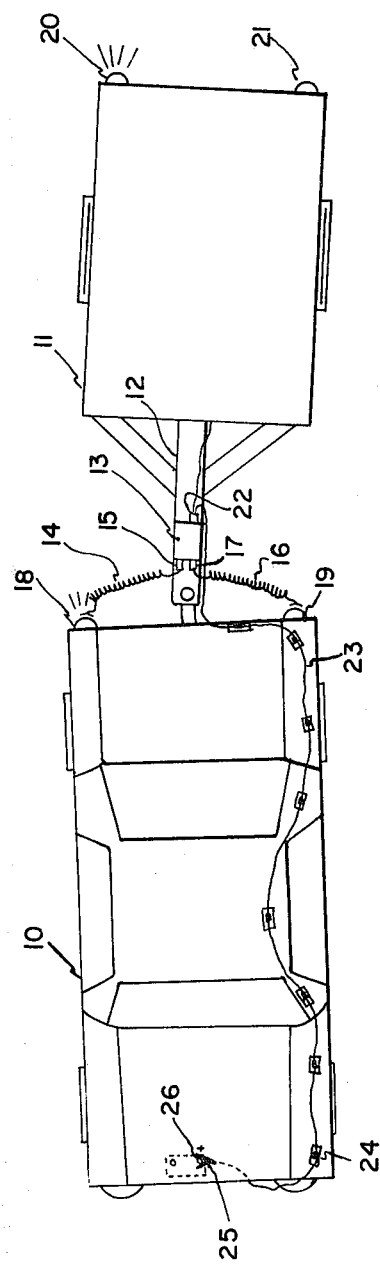
FIG. 1 is a plan view of a trailer and tow vehicle with the present invention installed.

FIG. 1 depicts an automobile 10 with a trailer 11 hitched to the rear of the automobile. A control module 13 is mounted on the trailer tongue 12. Mounted within the control module a printed circuit board supports electrical and electronic components. The control module 13 has attached a right sensor lead 14 and a left sensor lead 16. The sensor leads are connected to the control module by waterproof connectors 15 and 17 respectively. The free end of sensor leads 14 and 16 contains a light sensitive photodiode device. The free ends of the sensor leads are temporarily affixed to the outside surface of automobile right and left taillight surfaces 18 and 19. The right taillight 18 is depicted as illuminated as is the trailer right taillight 20. The trailer taillights 20 and 21 are connected to the control module 13 by means of wires terminating at waterproof connector 22. Also attached to connector 22 is an insulated wire 23. Wire 23 is equipped with eight sliding magnetic attachment devices as illustrated by 24. Wire 23 passes under the vehicle's front hood area and is terminated with a battery clip 25 which is represented as attached to the vehicle's positive battery terminal 26.

FIG. 2 illustrates a sensor lead assembly in greater detail. The lead 14 is an extendable coil cord containing two insulated conductors. Connector 15 is of a two circuit waterproof variety with an adhesive sealant 50 applied at the cable juncture. A photodiode sensor 51 is soldered to the two conductors contained in lead 14. Insulation and a moisture sealant is applied at the base of the photodiode. A short length of nylon webbing 52 is attached to the lead 14 by means of heat shrinkable tubing 53. The nylon webbing is positioned on the opposite side as the light sensitive portion of the photodiode 51. A tacky mastic type adhesive 54 is positioned on the nylon webbing 52 to facilitate temporary attachment of the sensor lead assembly to a towing vehicle taillamp lens. The adhesive is a reuseable type and does not harden over extended periods of useage.

FIG. 4 illustrates a magnetic attachment device 24 which consists of a vinyl plastic magnet 100 with a short length of hollow plastic extrusion 101 attached by means of adhesive. A portion of insulated wire 23 is shown passing through the extrusion 101.

FIG. 5 depicts a mercury sensing switch 125 mounted to a printed circuit board 126. Mounting leads 127 are bent to angle A such that the mercury will break contact when the device is mounted level and decelerated at a rate corresponding to approximately 20% of the acceleration rate of the earth's gravity at the earth's surface.

Figure 6:
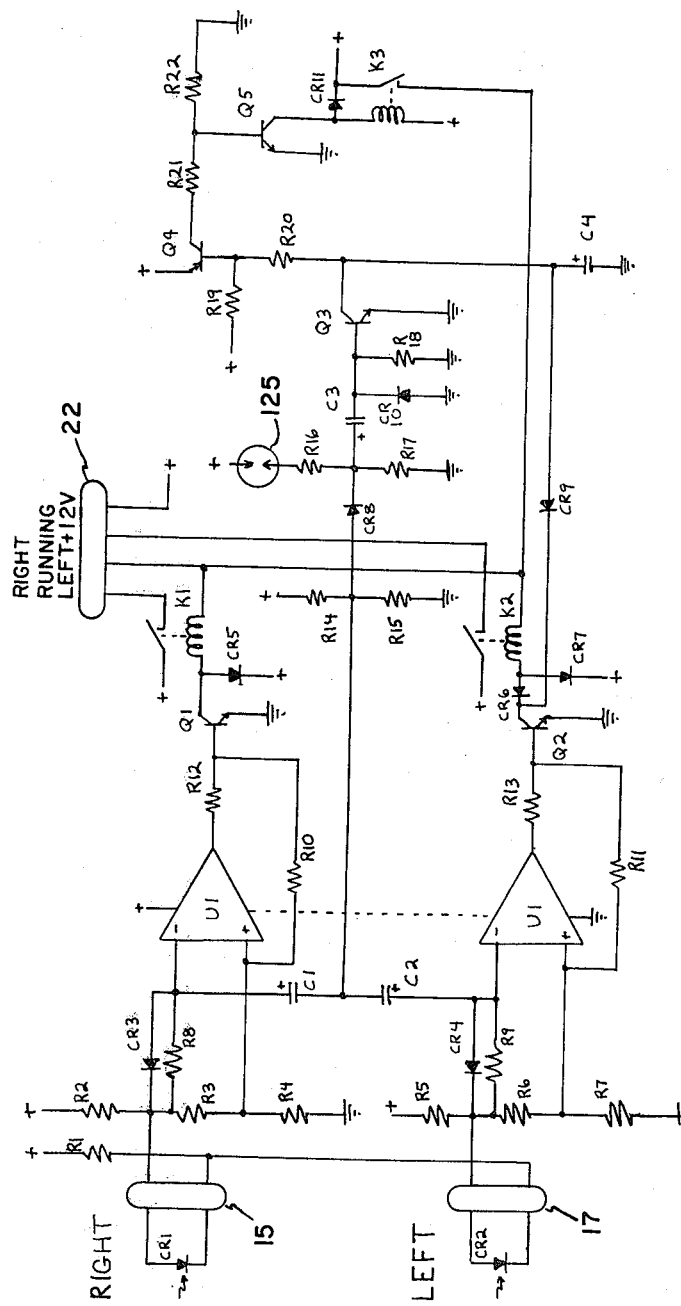
FIG. 6 is circuit diagram illustrating a preferred control circuit.

FIG. 6 is a circuit diagram primarily representing the electrical and electronic components mounted within the control module of FIG. 1 and their electrical interconnection. Connectors 15, 17 and 22 as illustrated in FIG. 1 are represented by an oval symbol in FIG. 6. Mercury sensor 125 as illustrated in FIG. 5 is represented by a circular symbol in FIG. 6. Triangular symbols U1 represent high input impedance voltage amplifier comparators. The (+) symbol used in FIG. 6 represents +12 volt DC power as supplied on connector 22. The +12 volt DC power may be derived from the towing vehicle battery as illustrated in FIG. 1 or may be derived from a battery mounted on the trailer. The ground symbol in FIG. 6 represents the battery return current connection. In the preferred embodiment the return current passes through one of the mounting bolts associated with the control module 13 of FIG. 1 and passes through the metal structure of the trailer tongue. If +12 volt power is derived from the towing vehicle as illustrated in FIG. 1 then the return current passes through the trailer ball to the frame of the towing vehicle. Occasionally, an auxiliary clip lead may be required between the frame of the towing vehicle and the trailer tongue if a reliable ground connection is not obtained through the ball as associated with heavy rust accumulation or paint. On connector 22 three additional connections are labeled "Right," "Running" and "Left." "Right" and "Left" refer to the trailer taillamps having combined function of turn indicator and brake light. The connector terminals are switched to the +12 volts to cause illumination of the respective trailer taillamps 20 and 21 of FIG. 1. Both "Right" and "Left" are activated to indicate brake function. Similarly, trailer running lights are activated when the respective connector terminal is switched to +12 volt DC.

OPERATION

Referring to FIG. 6, two essentially identical light sensing input channels are represented. The channels are labeled "RIGHT" and "LEFT." The following discussion will pertain to the "RIGHT" channel specifically and to the "LEFT" channel by analogy. Generally, the components on the right half of FIG. 6 are not channel associated.

Photodiode CR1 is located at the end of the sensor lead assembly as illustrated as 51 in FIG. 2. As light falls on the sensor CR1 a positive current flows from cathode to anode in the normal manner of photodiode operation. The cathode is connected to the positive supply through resistor R1 which functions to limit current in the event of an accidental short from the sensor lead to ground. The anode of CR1 connects to a resistive divider comprising R2, R3 and R4. An increase in light falling on CR1 causes an increase in light current resulting in an increased voltage at the junction of R2 and R3 and at the junction of R3 and R4. The latter junction connects directly to the (+) input of voltage comparator U1 whereas the junction of R2 and R3 connects to the (−) input of comparator U1 through a time delay network comprising R8 and C1. Consequently an increased photodiode current is instantaneously reflected at the (+) input but arrives at the (−) input by the exponential charging of capacitor C1. If photodiode current increases by a sufficient amount, then the (+) comparator input voltage will temporarily exceed the (−) comparator input voltage and the output state of U1 will switch from negative to positive. A positive output voltage on U1 will generate a base current in Q1 through R12. A small amount of positive feedback is provided by resistor R10 which senses the base-emitter voltage of Q1 when U1 is in its positive output state. The positive feedback provides for clean switching in the state of U1. Transistor Q1 is saturated thus activating relay K1 if relay contact K3 is closed providing a positive source. Diode CR5 functions to clamp inductive relay transients.

If the photodiode current of CR1 remains at any particular level for more than a few minutes, a steady state voltage becomes established on capacitor C1 equal to the voltage at the junction of R2 and R3. Under this condition the (−) input of U1 is at a greater voltage level than the (+) input forcing U1 to the negative output state. U1 will switch to the positive output state only when the photodiode current increases by an amount sufficient to overcome the delta threshold voltage established across R3 in the steady-state. Since the voltage across R3 is proportional to the voltage at the junction of R2 and R3, the operating threshold varies in relation to the previous steady state or a dynamic average steady state voltage if fluctuations have occurred. The operating threshold can be considered as proportional to the sum of the aforementioned steady state diode current plus a fixed amount determined by resistor R2. This character of the threshold function has operational advantages in that the detector becomes most sensitive when the previous steady state diode current is low as can be associated with the more ideal condition when little or no sunlight or other ambient light is reflected in the tow vehicle taillamp 18 or 19 of FIG. 1. When ambient light is at a higher level the voltage on C1 increases to effectively adapt to the ambient condition while at the same time the delta threshold also increases as established by the steady state voltage across R3 thus mediating the prospect of false actuation due to ambient light fluctuations when strong ambient light is present. The adaptive feature of the operating threshold also serves to accommodate the light generated by the tow vehicle running lights.

Another significant feature of the threshold function is associated with diode CR3. The combination of diode CR3 and resistor R8 provides that capacitor C1 only gradually charges through R8 but rapidly discharges through CR3 whenever the capacitor voltage exceeds the voltage associated with the light current at the junction of R2 and R3 by an amount of one silicon diode forward voltage drop. This feature has several important operational advantages. After a long sustained period of brake application the detector circuit becomes rapidly resensitized so that subsequent brake and turn signal actuations will be detected with improved signal margin and detection time duration. A similar improvement in performance is associated with other possible reductions in light signal as might be associated with a reduction in reflected sunlight or terminated illumination of tow vehicle running lights. Because of the differential adaptation rate associated with the combination of CR3 and R8, the system is able to accommodate and continuously detect flashing tow vehicle turn signal indications even though the duty cycle of such flashing varies over a wide range. In many instances the duty cycle of tow vehicle flashers is found to be very unfavorable to systems not employing differential adapt rates. The forward voltage threshold of the fast adapt function serves to discriminate between large signal reductions which require rapid adaptation and lesser fluctuations which do not. Generally, it is not desirable that the threshold follow the lesser signal reductions because the result could be excessive sensitivity or false detections when such reductions are associated with ambient light fluctuations soon to be followed by signal increases.

Capacitor C1 is referenced to a DC bias network comprising resistors R14 and R15. Mercury sensor switch 125 is a normally closed circuit. If deceleration occurs exceeding a certain threshold then mercury sensor switch 125 as illustrated in FIG. 5 becomes an open circuit. As this occurs capacitor C3 discharges through R17. When the voltage at the junction of C3 and R17 falls one diode drop below the reference voltage of R14 and R15, then diode CR8 begins to conduct, reducing the reference voltage. The reduced reference voltage is reflected through capacitors C1 and C2 as a reduced voltage on the right and left channel (−) comparator inputs causing actuation of both channels to indicate the braking function. The deceleration detecting system serves as an auxiliary brake signalling system which functions, if for example, the optical sensing lead accidentally becomes detached from the tow vehicle. The sensitivity of the mercury sensing switch 125 of FIG. 5 is adjusted by the angle "A" with respect to the level. The sensitivity is selected to detect all moderate to strong braking decelerations yet without activating on downhill road grades. Because the action of the deceleration sensing circuit passes through the adaptive circuit path associated with capacitors C1 and C2, the indication will be rejected if the signal is unnaturally sustained. Short duration actuations of the mercury sensor 125 are rejected by the time delay function associated with the discharge of capacitor C3 thus preventing actuation of trailer brake lights due to road bumps, etc.

Short duration actuations of the mercury sensor 125 do, however, have an important role in controlling the running light system in the preferred embodiment. When the trailer is in motion, road bumps and vibration will cause transient actuation of the mercury switch 125. The mercury switch temporarily becomes open circuit causing the discharge of capacitor C3 through resistor R17. An associated current flows in diode CR10 which becomes transiently forward biased. Upon subsequent closure of mercury sensor 125, capacitor C3 recharges through the resistive divider comprising R16 and R17. An associated transient current flows in the base circuit of Q3 which becomes transiently forward biased. An amplified collector current flows in transistor Q3 discharging capacitor C4. During and after the discharge of C4 a current flows in the base circuit of Q4 through resistor R20. An amplified collector current flows from Q4 through R21 to the base of transistor Q5. The amplified collector current of Q5 operates relay K3. The contact of relay K3 provides the power source to operate the trailer's running lights and additionally provides the power source for relays K1 and K2 enabling their operation. Capacitor C4 continues charging through resistor R20 for a few minutes providing a time delay hold function on the operation of relay K3. As the charge on capacitor C4 accumulates, the current levels through transistors Q4 and Q5 will reduce to levels which will cause relay K3 to drop-out. Resistors R18, R19 and R22 function to shunt possible collector-base leakage current in transistors Q3, Q4 and Q5 respectively. Diode CR11 protects transistor Q5 against inductive transients from relay K3. In operation the time delay associated with the charging of capacitor C4 is effectively restarted each time the mercury switch 125 is transiently actuated. A second path also exists for discharging capacitor C4 and restarting the associated timing function; The capacitor can be discharged through diode CR9 and transistor Q2. Transistor Q2 is conducting whenever left turn indication or left brake light is detected. In operation this feature allows that running lights will be held on by operation of the left turn indicator or brakes. Also the circuit configuration insures that trailer running lights are activated immediately when power is first applied or after any power interruptions.

The circuit of FIG. 6 will accommodate either single sensors as illustrated in FIG. 2 or dual sensors as illustrated in FIG. 3. The two configurations are interchangeable at connectors 15 and 17 of FIG. 1. The dual sensors provide two photodiode sensors in an electrical parallel connection. The dual sensors are useful on tow vehicles having separate turn and brake taillights. The light currents from the two parallel photodiodes are additive and the above discussion of operation is essentially unmodified. The dual sensors may also be used on a vehicle with combined turn and brake taillights simply by attaching both sensors to the same taillight lens.

The operation of the magnetic attachment device of FIG. 4 is worthy of discussion. The hollow extrusion 101 provides a slight friction fit with the insulated wire 23. This fit allows the magnetic attachment 24 to be readily moved along the wire to a position where the magnet can best be applied to the tow vehicle surface. In addition the wire 23 is free to rotate in the hollow extrusion 101 so as to relieve any torsional forces which might otherwise tend to lift the magnet free in some instances. Longitudinal lifting forces are also minimized due to fact that the hollow extrusion 101 is substantially shorter than the vinyl magnet 100 thus forces conveyed to the end of the hollow extrusion 101 are distributed over a broad area of the vinyl magnet and do not cause one edge of the magnet to break free with the rest to immediately follow. Furthermore the length of the hollow extrusion 101 is made long enough in relation to the vinyl magnet that it does not tend to bow upward at the center when upward forces are applied through the wire. Because the hollow extrusion 101 is short, holding the wire 23 close to the vinyl magnet, lateral forces conveyed by the wire have a small moment of rotation, thus minimizing any tendency of the magnetic attachment 24 to rotate free about one of the long edges of the vinyl magnet 100. Under the preferred embodiment, lateral forces may induce a sliding motion but the threshold of movement is considerably greater than if the wire 23 were not held proximate to the vinyl magnet 100.

While the above description contains many specificities, these should not be construed as limitations on the scope of the invention, but rather as an exemplification of one preferred embodiment thereof. Many other variations are possible, for example: Other power sources can be employed; the device can operate from a battery located on the trailer or other means of tapping the tow vehicle's battery can be employed such as a connection to the cigarette lighter of license plate lighting circuit. Batteries are frequently already present on certain types of trailers as for example, compressor trailers, generator trailers and recreational vehicle trailers. The control unit can be mounted at positions other than the trailer tongue; for example, it can be mounted on a temporary trailer hitch device, it can be provided with a magnetic base to allow temporary placement either on the trailer or tow vehicle or it can be loosely placed in or on the towing vehicle without any attachment means. Also, the control unit can be temporarily mounted on the trailer tongue by means of temporary mechanical attachment devices as for example wing nuts. The sensors can be attached to the tow vehicle by any of several methods besides the adhesive putty described above; the sensors can be attached by means of various types of adhesive coated tapes or by means of suction cups. There are many variations possible on the control means presented above for the trailer running lights. A day or night light sensing device could be utilized as an additional condition on the actuation of the running lights, the running lights could be actuated by acoustical signals associated with the vibration and sound of the rolling trailer. Alternatively, running lights can be manually controlled by a toggle switch or similar means. The running lights might also be controlled strictly by recognition of the brake and turn indicator function provided that a substantially longer holding time were also incorporated. Running lights can also be operated without control means such that the running lights are on whenever power is applied. Many variations of the control circuit are also possible; for example, the control circuit could be implemented using substantially digital circuit techniques. A digital architecture might for example use one or more analog to digital converter circuits on the optical sensing inputs while a microprocessor could provide the adaptation functions by gradually modifying a numerical representation of the light level thresholds. Time delay functions as described above could also be implemented by timing means incorporated within a microprocessor circuit. The optical sensors need not be of the photodiode variety as described above. Photovoltaic and many othe types of devices could be suitable for detecting the light signal from the towing vehicle. A polarized light detector or a detector responding to a specific wavelength band could provide some improvement in the performance of the sensor in distinguishing the actual tow vehicle taillamp light over sunlight reflected from the tow vehicle taillight structure. The light sensing devices need not necessarily be attached to the tow vehicle taillamp; sensing devices mounted on the trailer could be aimed at the tow vehicle taillamps or a single broad coverage sensing means in conjunction with electronics to distinguish the portion of the visual field corresponding to the tow vehicle taillamps could be mounted on the trailer at a central position on or near the trailer tongue.

I claim:

1. Electronic light sensing apparatus for coupling trailer taillight circuits to the taillights of a towing vehicle, said apparatus comprising:
    A. light sensing means for detecting the light output from the towing vehicle taillights and converting said output to an electrical signal;
    B. circuit means for responding to said electrical signal, including switching means to control said trailer taillight circuits; and
    C. means in said circuit means for discriminating normal operation of towing vehicle turn or brake indications from various ambient lighting conditions including continuous reflected sunlight and continuously illuminated running light filaments within the same taillight structure as associated with said turn or brake indications.

2. The apparatus of claim 1, said circuit means for responding to said electrical signal having an adaptive operating threshold for operation of trailer turn or brake light indicators whereby said threshold is gradually modified in response to change of said electrical signal.

3. The apparatus of claim 2 including said adaptive operating threshold with provision for gradual modification of said threshold and additionally with provision for rapidly modifying said threshold when said electrical signal becomes substantially lesser in magnitude than said threshold thereby providing rapid resensitization following a sustained period of tow vehicle brake light operation or termination of other sustained light sources such as reflected sunlight.

4. The apparatus of claim 1, said circuit means for responding to said electrical signal including additional circuit means for controlling trailer running lights by detecting trailer motion and including a time delay means whereby trailer running lights are illuminated while said trailer is in motion and for a period of time after said trailer comes to rest.

5. The apparatus of claim 4, said means for controlling trailer running lights by detecting trailer motion including inertial sensing means such that vertical motion associated with road bumps and trailer suspension oscillation will cause operation of said trailer running lights or restarting of said time delay means.

6. The apparatus of claim 4, said means for controlling trailer running lights by detecting trailer motion including means of actuating said running lights or restarting said time delay means whenever the trailer left turn or brake indication is actuated.

7. The apparatus of claim 1, said circuit means for responding to said electrical signal including additional means for responding to inertial brake sensing means such that trailer brake lights are actuated whenever deceleration greater than a specified level is detected.

8. The apparatus of claim 1 including a rechargeable battery power source located either on the trailer or on the towing vehicle.

9. The apparatus of claim 8 including means of deriving power directly from the towing vehicle battery terminal, including a flexible electrical conductive means equipped with magnetic attachment means along said electrical conductive means whereby said electrical conductive means can be easily attached to the metal exterior of said towing vehicle.

10. The apparatus of claim 9, said magnetic attachment means comprising a magnetic material on which is permanently attached a device for loosely holding an electrical conductive means proximate to said magnetic material.

11. The apparatus of claim 10, said magnetic material consisting of flexible magnetic material whereby said magnetic material will conform to contours of vehicle surface and will not scratch paint on vehicle surface.

12. The apparatus of claim 1, said light sensing means being attached to the ends of two flexible conductor means associated with the respective right and left side taillights of the towing vehicle whereby said light sensing means can be made proximate to said taillights while allowing for normal trailer rotation on turning and for the various possible positions of said taillights.

13. The apparatus of claim 12 including a flexible adhesive attachment structure located at the end of said flexible conductor means for the purpose of attaching said light sensing means to said taillights either by adhesive means applied directly to the attachment structure or by adhesive coated tape applied over said attachment structures and said taillights.

14. The apparatus of claim 12 including two or more said light sensing means separated by short lengths of flexible conductor means at the end of said right and left flexible conductor means thereby providing means of monitoring multiple separate taillights lenses on towing vehicles so equipped.

* * * * *